United States Patent [19]

Akatsu

[11] Patent Number: 5,135,380
[45] Date of Patent: Aug. 4, 1992

[54] SUPPLY DEVICE FOR SUPPLYING FRICTION MATERIAL TO DEVOLATIZING DEVICE

[75] Inventor: Yozo Akatsu, Saitama, Japan

[73] Assignee: Akebono Brake Industry Co., Ltd., Tokyo, Japan

[21] Appl. No.: 510,244

[22] Filed: Apr. 19, 1990

[30] Foreign Application Priority Data

May 1, 1989 [JP] Japan .................. 1-150242[U]

[51] Int. Cl.$^5$ .............................. B29C 43/24
[52] U.S. Cl. .............................. 425/203; 425/363
[58] Field of Search .............. 425/363, 369, 362, 203, 425/335, 336; 29/121.1

[56] References Cited

U.S. PATENT DOCUMENTS

| 518,454 | 4/1894 | Holmes | 425/369 |
| 1,330,434 | 2/1920 | Ekberg | 425/362 |
| 2,477,009 | 7/1949 | Sandler | 264/349 |
| 2,548,009 | 4/1951 | Fether | 425/363 |
| 2,662,246 | 12/1953 | Klugh et al. | 425/362 |
| 2,842,071 | 7/1958 | Perky | 425/363 |
| 3,059,275 | 10/1962 | Vogt | 264/126 |
| 3,140,511 | 7/1964 | Seufert et al. | 425/363 |
| 4,289,470 | 9/1981 | Johnston et al. | 425/336 |
| 4,541,976 | 4/1985 | Batigne et al. | 425/363 |
| 4,725,217 | 2/1988 | Nitta et al. | 425/335 |
| 4,798,529 | 6/1989 | Klimmer | 425/289 |

Primary Examiner—Willard E. Hoag
Attorney, Agent, or Firm—Finnegan, Henderson, Farabow, Garrett, and Dunner

[57] ABSTRACT

A supply device for supplying a friction material to a conveyor provided in a devolatizing device. The friction material is agitated by an agitator and discharged therefrom to the conveyor. The supply device includes a pair of roller members each having at its outer periphery a plurality of annular grooves and a plurality of annular land portions. The annular grooves and the land portions extend circumferentially of the roller member and alternate. The axes of the pair of roller members are disposed parallel to each other. The land portions of one of the two roller members are engaged respectively in the annular grooves of the other roller member, and the land portions of the other roller member are engaged respectively in the annular grooves of the one roller member. The pair of roller members are adapted to be driven for rotation in opposite directions, and a gap for allowing the friction material to pass therethrough is formed between the bottom of a respective one of the annular grooves and a respective one of the land portions engaged therein.

4 Claims, 2 Drawing Sheets a
SUPPLY DEVICE FOR SUPPLYING FRICTION MATERIAL TO DEVOLATIZING DEVICE

BACKGROUND OF THE INVENTION

1. Field of the Invention

The present invention relates to a supply device for supplying a friction material to a devolatizing device used in a process for the manufacture of disc pads for a disc brake, or other products.

2. Relted Art

In a process for manufacturing a friction product, a devolatizing step is carried out after a step of agitating a friction material, and serves to remove the volatile content or the water content from the friction material. In the agitating step, a solvent added to the friction material for promoting a uniform mixing of a reinforcement material (e.g. asbestos), a friction modifier, a binder and etc., or the & water content of the friction material adversely affects the friction material at a later press step. As a result, the shaped friction material may be subjected to a crack, a flaw and other damage. To avoid such damage, it is necessary to devolatize or dry the friction material after the agitating step. Such devolatizing is carried out by placing the friction material on a conveyer after the agitating step, and subjecting the friction material to hot-air drying.

However, in such conventional devolatizing step, the friction material having no specified shape is supplied to a devolatizing device after the agitating step, and therefore the devolatizing or drying operation is carried out in a discontinuous manner, and requires much time.

SUMMARY OF THE INVENTION

It is therefore an object of this invention to provide a supply device for supplying a friction material to a devolatizing device, which overcomes the above deficiencies of the conventional device. That is, an object of the invention is to provide a supply device for supplying a friction material to a devolatizing device by which a devolatizing or drying operation is carried out in a continuous manner with short time. & The above object is achieved by a provision of a supply device for supplying a friction material to a conveyer provided in a devolatizing device in which the friction material is agitated by an agitator and discharged therefrom to the conveyer which, according to the present invention comprises a pair of roller members each having at its outer periphery a plurality of annular grooves and a plurality of annular land portions, the annular grooves and the land portions extending circumferentially of the roller member and alternating, the axes of the pair of roller members being disposed parallel to each other, the land portions of one of the two roller members being engaged respectively in the annular grooves of the other roller member, the land portions of the other roller member being engaged respectively in the annular grooves of the one roller member, the pair of roller members being adapted to be driven for rotation in opposite direction, and a gap for allowing the friction material to pass therethrough being formed between the bottom of a respective one of the annular grooves and a respective one of the land portions engaged therein.

A plurality of short grooves can be formed in the outer peripheral surface of each land portion of at least one of the pair of roller members, the short grooves extending axially of the roller member. A partition member can be mounted on at least one of the pair of roller members, the partition member being fixedly secured to one of the bottom of each the annular groove and the outer periphery of each the land portion.

The wet friction material (the blending ratio of components thereof is determined depending on the kind of a brake) containing volatile and water contents are discharged from the agitator, and fed onto the pair of roller members in a heaped-up manner. The friction material is fed between and bitten by the two roller members rotating in opposite directions, and passes through the gaps each formed between the mating annular groove and land portion. As a result, the friction material is formed or shaped into bars, and is discharged onto a conveyer in a devolatizing chamber. During transfer of the friction material by the conveyers, the friction material is heated and dried by hot air, and the solvent is completely devolatized, and the water content is dried. The friction material fed onto the conveyer have been formed into bars as a result of the passage thereof through the gaps, and therefore the devolatization and the drying are promoted and carried out uniformly.

When the friction material passes through the gaps between the two roller members, a plurality of projections are formed on the bar-shaped friction material by the short grooves formed in the outer peripheral surface of each land portion of at least one of the two roller members. Therefore, the bar-shaped friction material has an increased surface area, which promotes the devolatization and the drying. Further, the short grooves are formed respectively in the roller member in a gear-toothed manner. Therefore, such gear-toothed configuration also serves to drive the friction material, heaped up on the two roller members, into the gaps between the two roller members. In order to efficiently achieve such driving of the friction material, it is preferred that the short grooves be formed respectively in the land portions of the two roller members.

The friction material is driven by the partition members (each of which divides the gap) into the gaps between the two roller members, and the bar-shaped friction material passed through the gap is cut into a predetermined length, thereby increasing a surface area of the bar-shaped friction material. This promotes the devolatization and the drying.

DESCRIPTION OF THE PREFERRED EMBODIMENTS

Figure 1:
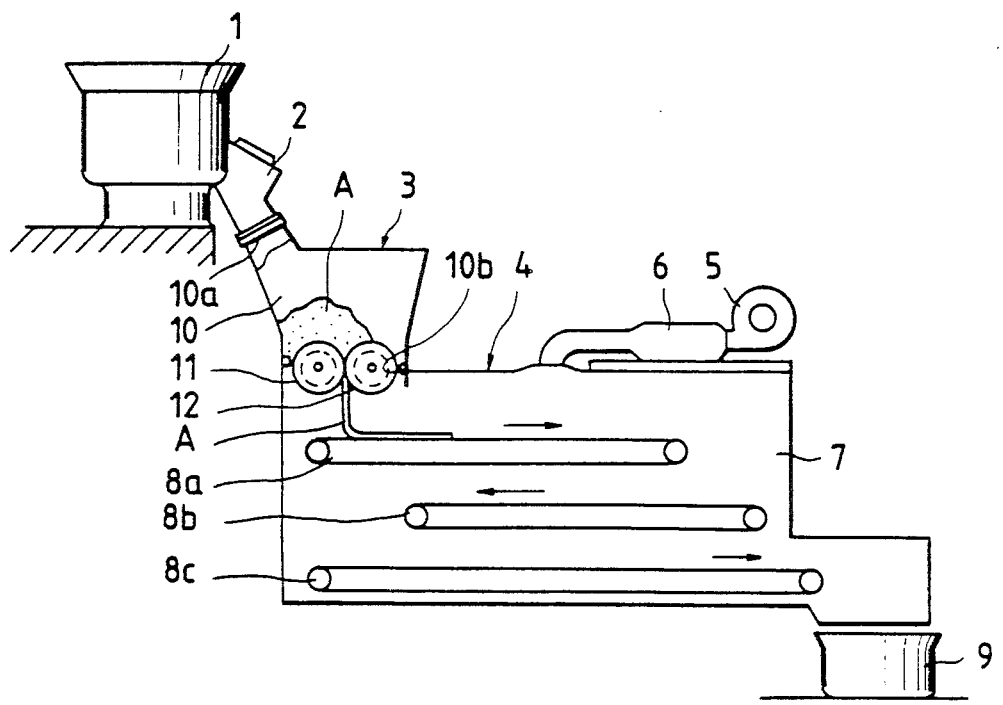
FIG. 1 is a partly-broken, front-elevational view of a friction material-processing apparatus incorporating a supply device according to the present invention.
Figure 4:
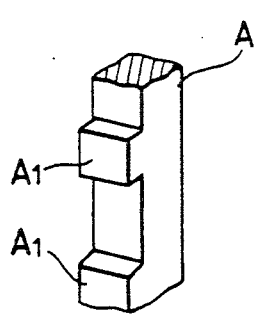
FIG. 4 is a fragmentary perspective view of a bar-shaped friction material.

The preferred embodiment of the invention will now be described with reference to accompanying drawings.

FIGS. 1 to 4 shows one preferred embodiment of the invention. An agitator 1 uniformly agitates a friction material A to be formed into a brake pad, the blending ratio of the components of the friction material being determined depending on the kind of a brake. At this time, in the case of a wet-type process, a small amount of a solvent is added to the friction material A in order to prevent segregation due to differences in specific gravity and particle size, thus ensuring a uniform mixture of the friction material A. The agitated friction material A is discharged from a gate of the agitator 1, and is guided by a chute 2, and then is fed to a supply device 3. A devolatizing device 4 has a devolatizing chamber 7. The air is fed by a blower 5, and is passed through a heater 6, so that a blast of hot air is fed to the devolatizing chamber 7. A plurality of conveyers 8a, 8b and 8c are mounted within the devolatizing chamber 7, and are disposed at different levels or heights. The friction material A is formed or shaped into a predetermined shape, and is discharged from the supply device 3 onto the uppermost conveyer 8a. Thus, the friction material A is sequentially transferred to the conveyers 8a, 8b and 8c, and at this time the friction material is subjected to hot-air drying at a predetermined temperature for a predetermined time period. Then, the friction material A is recovered by a container 9.

Figure 2:
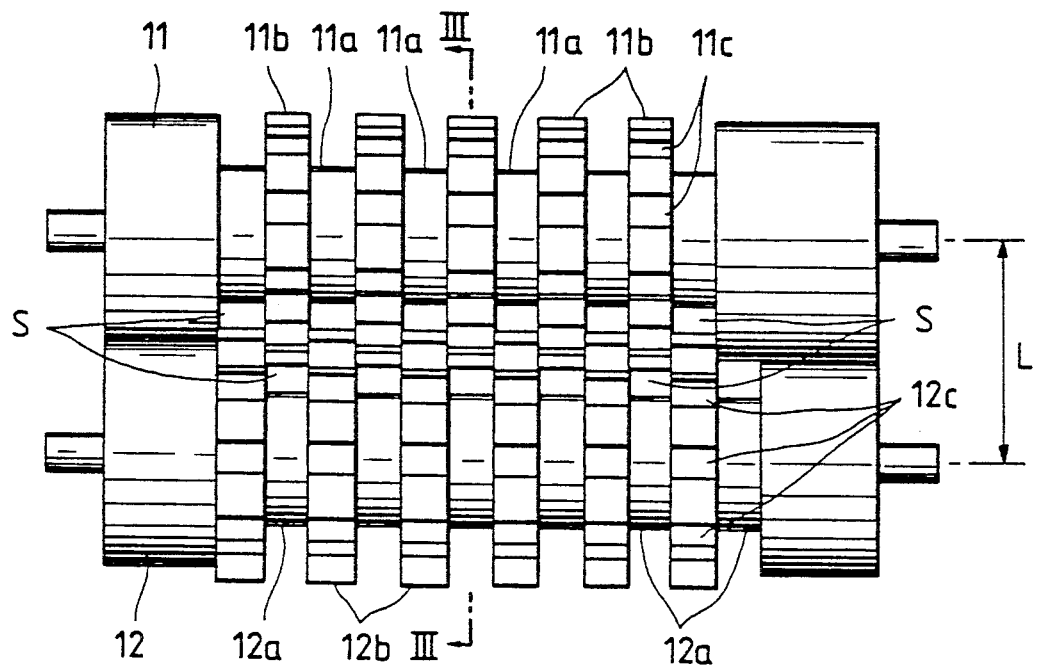
FIG. 2 is a plan view of two rollers of the supply device.
Figure 3:
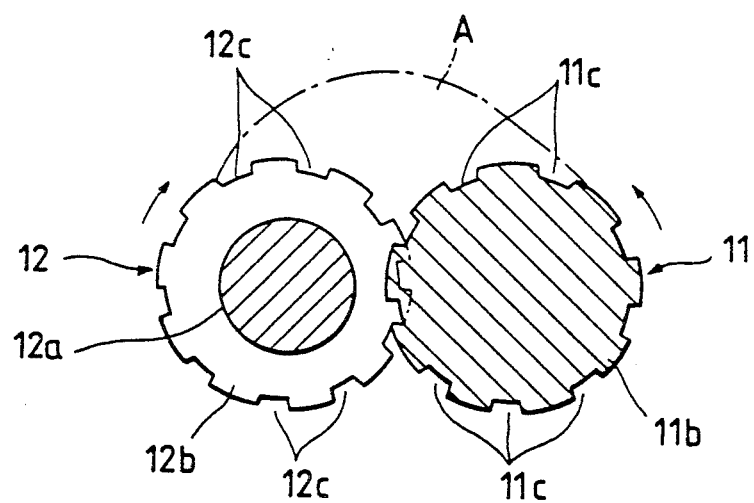
FIG. 3 is a cross-sectional view taken along the line III—III of FIG. 2.

The supply device 3 comprises a supply vessel 10 having an upper port 10a connected to the chute 2 of the agitator 1, and a pair of roller members 11 and 12 which close a lower port 10b of the supply vessel 10 and are disposed in parallel relation to each other. As shown in FIGS. 2 and 3, the roller members 11 and 12 have a plurality of circumferential annular grooves 11a and 12a, respectively, and a plurality of annular land portions 11b and 12b, respectively, the grooves 11a (12a) and the land portions 11b (12b) alternating. The width of each annular groove 11a, 12b in the axial direction of the roller member generally corresponds to the width of each land portion 11b, 12b. The land portions 12b of the roller member 12 are fitted respectively in the annular grooves 11a of the roller member 11, and similarly the land portions 11b of the roller member 11 are fitted respectively in the annular grooves 12a of the roller member 12. A plurality of short grooves 11c extending in the axial direction of the roller member 11 are formed in the outer peripheral surface of each land portion 11b, the short grooves 11c being circumferentially spaced at equal intervals. Similarly, a plurality of short grooves 12c extending in the axial direction of the roller 12 are formed in the outer peripheral surface of each land portion 12b, the short grooves 12c being circumferentially spaced at equal intervals.

The pair of roller members 11 and 12 are arranged, with their axes disposed parallel to each other, in such a manner that the opposed annular grooves 11a and land portions 12b as well as the opposed annular grooves 12a and land portions 11b are engaged with each other. The distance L adjusted as to provide a plurality of gaps S between the opposed annular grooves 11a and land portions 12b and between the opposed annular grooves 12a and land portions 11b. The gaps S allow the friction material A to pass therethrough. The two roller members 11 and 12 are rotated by rotary drive means (not shown) in opposite directions as indicated by arrows in FIG. 3, so that the two roller members 11 and 12 bit the friction material A therebetween. The depth of the short grooves 11c and 12c in the radial direction of the roller members 11 and 12 is smaller than the amount of overlap of the land portions 11b and 12b (see FIG. 3), and the adjacent short grooves 11c and 12c are circumferentially displaced with respect to each other so as not to be continuous with each other as much as possible.

With this arrangement, the gaps S are independent of one another.

The operation will now be described.

The wet friction material A (the blending ratio of the components thereof is determined depending on the kind of the disc brake) is discharged from the gate of the agitator 1, and is guided by the chute 2, and then fed to the supply vessel 10 of the supply device 3. As a result, the friction material A is applied onto the pair of roller members 11 and 12 (disposed in parallel relation to close the lower port 10b of the supply vessel 10) in a heaped-up manner. The friction material A is fed between and bitten by the two roller members 11 and 12 driven for rotation in the opposite directions by the rotary drive means (not shown). As a result, the friction material A is passed through the gaps S formed between the opposed annular grooves 11a and land portions 12b and between the opposed annular grooves 12a and land portions 11b. As a result, the friction material A is formed into bars of a rectangular cross-section, and then is discharged onto the uppermost conveyer 8a in the devolatizing chamber 7. Thus, the friction material A is sequentially transferred to the conveyers 8a, 8b and 8c disposed at the different levels, and during this transfer operation, the friction material A is heated by the hot air in the devolatizing chamber 7, thereby devolatizing the solvent and drying the water content. Finally, the friction material A is recovered by the container 9.

The temperature in the devolatizing chamber 7 as well as the speed of movement of the conveyers 8a, 8b and 8c (that is, the time required for the friction material A to pass through the devolatizing chamber 7) is suitably adjusted so as to completely devolatize the solvent and to dry the friction material A to 0.5 to 0.8% of the water content. The friction material A fed to the uppermost conveyer 8a is in the form of bars of a rectangular cross-section since the friction material has been passed through the gaps S between the two roller members 11 and 12. Therefore, the devolatization and the drying are promoted, and can be carried out generally uniformly. In addition, since the friction material A passes through the gaps S between the two roller members, the bar-shaped friction material A has projections A1 formed by the plurality of short grooves 11c, 12c in the land portion 11b, 12b of the roller member 11, 12, the projections A1 being spaced from one another at predetermined intervals. Therefore, the bar-shaped friction material A has an increased surface area, which promotes the devolatization and the drying. The short grooves 11c and 12c are formed respectively in the two roller members 11 and 12 in a gear-toothed manner. Therefore, such gear-toothed configuration also serves to drive the friction material A, heaped up on the two roller members 11 and 12, into the gaps S between the two roller members 11 and 12. In order to efficiently achieve such driving of the friction material A, although it is preferred that the short grooves 11c and 12c be formed respectively in both land portions 11b and 12, either the land portion 11b or the land portion 12b may have the short grooves, in which case similar effects can be achieved.

Figure 5:
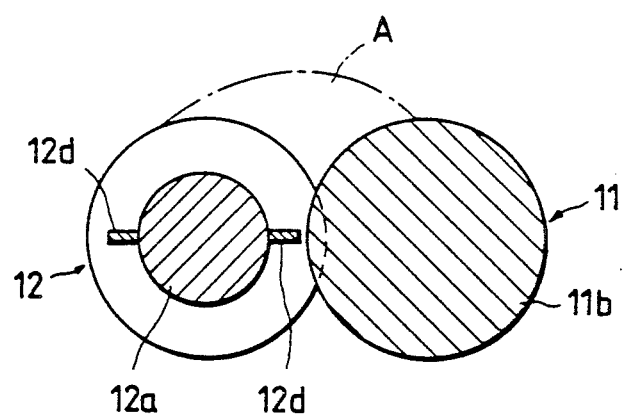
FIG. 5 is a view similar to FIG. 3, but showing a modified form of the invention.

FIG. 5 shows an important portion of another embodiment of the invention. In this embodiment, partition members 12d are fixedly secured to the bottom of each of annular grooves 12a in a roller member 12, so that the gap S is divided by the partition members 12d. With this arrangement, the friction material A is driven by the partition members 12d into the gap S between the two roller members 11 and 12, and the bar-shaped friction material A passed through the gap S is cut into a predetermined length, thereby increasing a surface area of the bar-shaped friction material. This promotes the devolatization and the drying. The partition members 12d may be fixedly secured to each of the land portions 11b of the roller member 11.

The devolatizing chamber has not only the function of devolatizing the solvent but also the function of drying the water content. Therefore, this invention is applicable not only to a wet-type process using a solvent or the like, but also to a dry-type process.

The friction material A dried and held in the container 9 as described above is pulverized into powder or particles by a pulverizer, and then is preformed by pressing.

As described above, in the present invention, the friction material in the form of uniformly bars are continuously supplied to the devolatizing device, and the devolatization and the drying are uniformly carried out. Therefore, the molded friction material produced at a later pressing step is not subjected to a crack, a flaw or the like, thereby assuring a good quality of the molded product.

What is claimed is:

1. A supply device for suppling a friction material to a conveyer provided in a devolatizing device, the friction material being agitated by an agitator and discharged therefrom to the conveyer, said supply device comprising:

a pair of roller members each having at its outer periphery a plurality of annular grooves and a plurality of annular land portions, said annular grooves and said land portions extending circumferentially of said roller member and alternating, the axes of said pair of roller members being disposed parallel to each other, said land portions of one of said two roller members being engaged respectively in said annular grooves of the other roller member, said land portions of said other roller member being engaged respectively in said annular grooves of said one roller member, said pair of roller members being rotatable in opposite directions, and said roller members forming a gap for allowing the friction material to pass therethrough between the bottom of a respective one of said annular grooves and a respective one of said land portions engaged therein;

a partition member mounted on at least one of said pair of roller members, said partition member being fixedly secured to one of the bottom of each said annular groove and the outer periphery of each said land portion; and a shallow groove in the outer peripheral surface of each said land portion of at least one of said pair of roller members, said shallow groove extending axially of said roller member, and said shallow groove having a depth less than the depth of said annular grooves.

2. A supply device according to claim 1, further comprising a plurality of shallow grooves in the outer peripheral surface of each said land portion of at least one pair of roller members.

3. A devolatizing device for devolatizing and drying a friction material, comprising:

agitating means for agitating the friction material;
heating means for heating the friction material; and
supply means for supplying the friction material from the agitating means to the heating means, said supply device means comprising:

a pair of roller members each having at its outer periphery a plurality of annual grooves and a plurality of annular land portions, said annular grooves and said land portions extending circumferentially of said roller member and alternating, the axes of said pair of roller members being disposed parallel to each other, said land portions of one of said two roller members being engaged respectively in said annular grooves of the other roller member, said land portions of said other roller member being engaged respectively in said annular grooves of said one roller member, said pair of roller members being adapted to be driven for rotation in opposite directions, and said roller members forming a gap for allowing the friction material to pass therethrough between the bottom of a respective one of said annular grooves and a respective one of said land portions engaged thereto;

a partition member mounted on at least one of said pair of roller members, said partition member being fixedly secured to one of the bottom of each said annular groove and the outer periphery of each said land portion; and a shallow groove in the outer peripheral surface of each said land portion of at least one of said pair of roller members, said shallow groove extending axially of said roller member, and said shallow groove having a depth less than the depth of said annular grooves.

4. A supply device according to claim 3, further comprising a plurality of shallow grooves in the outer peripheral surface of each said land portion of at least one pair of roller members.

* * * * *

UNITED STATES PATENT AND TRADEMARK OFFICE
CERTIFICATE OF CORRECTION

PATENT NO. : 5,135,380
DATED : August 4, 1992
INVENTOR(S) : Yozo Akatsu

It is certified that error appears in the above-identified patent and that said Letters Patent is hereby corrected as shown below:

Title page, item [30], change "1-150242" to --1-50242--.

Claim 1, column 5, line 27, change "suppling" to --supplying--.

Claim 3, column 6, line 21, change "annual" to --annular--.

Signed and Sealed this

Fifth Day of October, 1993

Attest:

Attesting Officer

BRUCE LEHMAN

Commissioner of Patents and Trademarks